United States Patent [19]

de Vries

[11] 4,126,793
[45] Nov. 21, 1978

[54] CIRCUIT ARRANGEMENT FOR A REMOTE CONTROL RECEIVER

[75] Inventor: Hans de Vries, Illnau, Switzerland

[73] Assignee: Zellweger Uster Limited, Uster, Switzerland

[21] Appl. No.: 738,897

[22] Filed: Oct. 18, 1976

[30] Foreign Application Priority Data

Dec. 3, 1975 [CH] Switzerland .................. 15705/75

[51] Int. Cl.² .................................. H01H 47/20
[52] U.S. Cl. .................................. 307/129; 307/3; 307/140; 340/310 A
[58] Field of Search ............ 307/3, 64, 105, 4, 140, 307/125, 129; 325/394, 472, 475; 340/310 A; 179/1 P; 328/162, 165

[56] References Cited

U.S. PATENT DOCUMENTS

| 3,467,835 | 9/1969 | De Cola | 340/310 A |
| 3,906,384 | 9/1975 | Schiffman | 328/165 |
| 3,916,211 | 10/1975 | de Vries | 307/64 |

Primary Examiner—Robert K. Schaefer
Assistant Examiner—Morris Ginsburg
Attorney, Agent, or Firm—Werner W. Kleeman

[57] ABSTRACT

A circuit arrangement for a remote control receiver, especially a ripple control receiver, which receives remote control signals from a power mains, comprising means for reducing the ambiguity of the response characteristic of the remote control receiver caused by at least one non-linear circuit element connected with the input of a selective receiver section of the remote control receiver.

8 Claims, 10 Drawing Figures

SELECTIVE RECEIVER SECTION

CIRCUIT ARRANGEMENT FOR A REMOTE CONTROL RECEIVER

BACKGROUND OF THE INVENTION

The present invention relates to a new and improved construction of a circuit arrangement for a remote control receiver, especially a ripple control receiver.

Remote control receivers which have their input signal delivered thereto in the form of a signal superimposed upon the line voltage, especially ripple control receivers, are required in very large numbers. For reasons of economy it is therefore absolutely indispensable that such receivers, notwithstanding the considerable technological requirements which are placed thereon, can be fabricated extremely priceworthy. For practical reasons it is additionally desired to maintain the volume or size of such receivers as small as possible. For instance, such receivers are used for actuating street lighting and, therefore, they are preferably installed in the lighting fixture, so that small spatial dimensions are especially desired.

Such receivers possess a selective receiver section for the assigned remote control frequency, an evaluation section arranged following the selective receiver section for the remote control commands which, as a general rule, are in coded form, at least one switching element, actuated by this evaluation section as a function of the evaluation result, for switching-on and switching-off a remotely controlled object, for instance a street lamp, a hot water boiler and so forth. Further, the receiver contains a current supply section, for instance a transformer with which there is connected a rectifier and a filter or smoothing capacitor associated therewith for producing the operating voltages and operating currents needed by the individual sections of the receiver.

While in the past there have been provided at the selective receiver section preferably LC-circuits and in the evaluation section electromechanically operating devices, which, for instance, act purely mechanically upon the switching elements provided for carrying out a remote control command, in more recent times there have been increasingly employed purely electronically operating devices for the aforementioned purposes. Significant in this regard are, for instance, the systems disclosed in Swiss Pat. Nos. 554,617 and 554,618.

In the circuit arrangements disclosed in the aforementioned Swiss patents there is provided for the current supply a transformer following which there is connected a full-wave rectifier and a filter capacitor associated therewith. This arrangement allows for a technically faultless operation, but does not constitute the most economical solution because, a power transformer is relatively expensive. Since the primary side of such power transformer is connected with the power mains or power supply network, it must be designed to withstand surge voltages.

In U.S. Pat No. 3,978,388 (corresponding to Swiss Pat. No. 567,344) there are described current supply arrangements dispensing with the use of a power transformer. These solutions thus fulfill the requirement of increased economy. Moreover, in U.S. Pat. No. 3,916,211 (corresponding to Swiss Pat. No. 567,824), there is disclosed a circuit arrangement for an electronic remote control receiver which is characterized by the features that a remotely controlled switching element has associated therewith a switching energy storage, with the result that, among other things, there is realized the advantage that the current supply arrangement can be designed even more economically.

Since, on the one hand, with such remote control receiver, currents at the network frequency and harmonic currents of the network frequency and, on the other hand, currents at the frequency of remote control signals appearing on the power line and disturbance signals flow through common current paths containing circuit elements having non-linear characteristic, such as for instance diodes, push-pull or full-wave rectifiers and diode rectifiers as well as Zener diodes and so forth, the possibility exists of mutually mixing or frequency transforming the different frequencies which are present. This has the result that, depending upon the prevailing conditions, there appears a more or less large spectrum of undesired new frequencies. Again, depending upon the given conditions there can be present disturbance frequencies of an intensity which no longer can be neglected.

Owing to the aforementioned mixing and transformation effect the danger exists that the remote control receiver no longer will only respond to the remote control frequency assigned to it, rather — although indeed with lesser sensitivity — also to other frequencies which have been promoted by the aforementioned mixing effect. Thus, the response characteristics of the remote control receiver becomes ambiguous.

SUMMARY OF THE INVENTION

With the foregoing in mind, it is a primary object of the present invention to provide a novel circuit arrangement for remote control receivers which is not associated with the aforementioned drawbacks and limitations of the prior art constructions.

Another and more specific object of the present invention aims at the provision of a circuit arrangement for a remote control receiver, especially a ripple control receiver, which receives its remote control signals by means of a power supply network, wherein notwithstanding its economical construction, in particular in spite of intentionally avoiding the use of a power transformer, there can be effectively suppressed the aforementioned ambiguity of the response characteristic.

Now in order to implement these and still further objects of the invention, which will become more readily apparent as the description proceeds, the invention contemplates a circuit arrangement for a remote control receiver to which the remote control signals are delivered by means of the power supply network, which is manifested by the fact that means are provided in order to reduce the ambiguity of the response characteristic of the remote control receiver produced by at least one non-linear circuit element which is connected in circuit with the input of a selective receiver section of the remote control receiver.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that as a matter of convenience, throughout the various figures corresponding components have been designated with the same reference characters.

Before describing individual exemplary embodiments of the invention, for purposes of improving the understanding thereof, there will be explained more fully hereinafter the problem to be solved by the invention in conjunction with an example of a prior art remote control or ripple control receiver.

Figure 1:
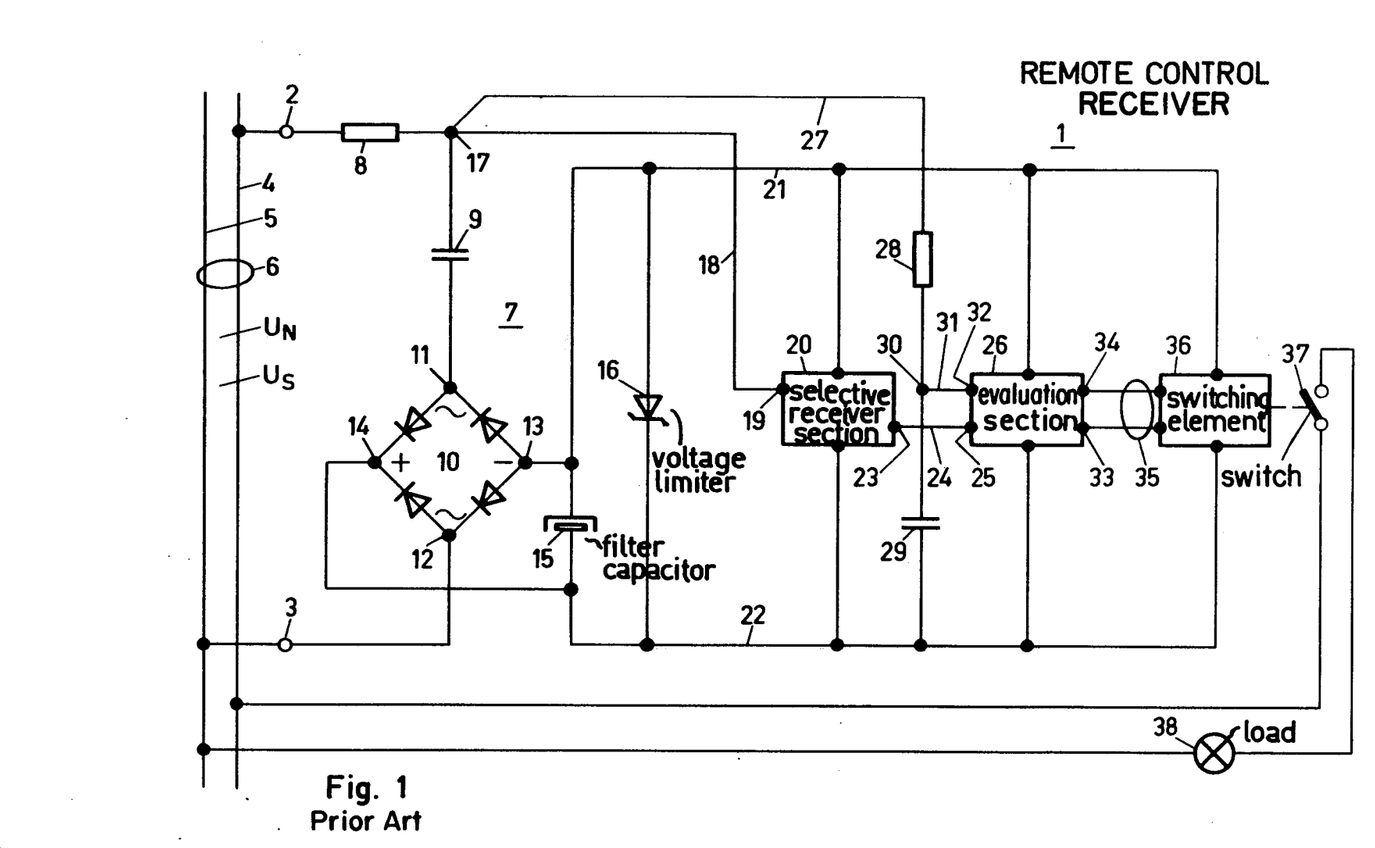
FIG. 1 is a circuit diagram of a prior art remote control receiver.

Turning attention to FIG. 1 there is illustrated therein in toto the circuitry of a remote control receiver 1. The remote control receiver 1 is connected by means of its input terminals 2 and 3 at two conductors or lines 4 and 5 of an alternating-current network 6. Thus, for instance, the conductor 4 can be a phase conductor and the conductor 5 a null conductor. However, it is also possible to connect the remote control receiver with two phase conductors of the power supply network or power mains. The alternating-current network 6, to which belong both of the aforementioned conductors or lines 4 and 5, have superimposed thereon in conventional manner remote control commands in the form of alternating-current pulse sequences. Thus, apart from the network alternating-current voltage $U_N$ there thus appear at the input terminals 2 and 3 also the remote control signal voltages $U_S$ superimposed thereon and possible disturbance signals.

For the current supply of the remote control receiver 1 there is provided a current supply arrangement or section 7. The current supply arrangement 7 comprises a series circuit of a protective impedance 8 for surge voltages connected with the input terminals 2 and 3, a capacitor 9 and a full-wave rectifier 10. The full-wave rectifier 10 is constructed as a Graetz rectifier. Its alternating-current terminals 11 and 12 are located in such series circuit, whereas at its direct-current terminals, i.e. the negative terminal 13 and the positive terminal 14, there are connected a filter capacitor 15 and a voltage limiter 16, for instance a Zener diode.

As the protective impedance 8 there can be provided, for instance, a surge voltage-resistant resistor or a surge voltage resistant-choke coil. For the operation of the electronic circuit of the remote control receiver 1 there is only required a relatively low direct-current voltage of, for instance, 20 volts, for which reason there is connected in series with the alternating-current terminals 11 and 12 of the full-wave rectifier 10 as a capacitive and therefore loss-free dropping resistance the series capacitor 9 which, related to the network voltage $U_N$, produces the required voltage drop. Since the current consumption of the electronic circuit is extremely modest, the current supply section or arrangement 7 only has low power requirements of, for instance, about 0.3 watts and, therefore, can be fabricated extremely economically since the capacitor 9 need only possess a small capacitance of, for instance, approximately 0.3 $\mu F$.

Leading from the circuit point or junction 17, following the protective impedance 8, is a conductor or line 18 to an input 19 of a frequency selective receiver section or portion 20. This receiver section 20 possesses, for instance, at least one active RC-filter as the selective means for the remote control frequency $f_S$. The receiver section 20 which has only been schematically shown in FIG. 1 by the block 20 is connected, on the one hand, with the negative busbar 21 and, on the other hand, with the positive busbar 22, so that it receives from the current supply section or arrangement 7 the necessary supply voltage. An output terminal 23 of the receiver section 20 is connected by means of a conductor 24 with a first input 25 of an electronically operating evaluation section or portion 26 of the remote control receiver 1. A conductor 27 leads from the junction 17 to an RC-element consisting of a resistor 28 and a capacitor 29. Leading from the connection point or junction 30 of the resistor 28 and the capacitor 29 is a conductor 31 to a second input 32 of the evaluation section 26.

By means of this RC-element 28, 29 the evaluation section 26 has delivered to its second input 32 a signal at the network frequency. With the aid of this network frequency signal and electronic frequency dividers there is formed in the evaluation section 26 a sequence of clock pulses bound to the network frequency $f_N$ for an electronic time base for the evaluation of a received pulse sequence.

The evaluation section 26 is for instance designed so as to be completely electronic and is, for example, fabricated at least partially according to integrated circuit technology. Also the evaluation section 26 is connected with the negative busbar 21 and the positive busbar 22 in order to obtain the required supply voltage from the current supply arrangement 7. Electronic evaluation sections for remote control receivers are well known in the art, for instance as disclosed in German Pat. No. 1,166,333 and German patent publication No. 1,814,992, the disclosures of which are incorporated herein by reference and to which reference may be readily had, so that it is not necessary to here consider further details. Depending upon whether the evaluation section 26 delivers a so-called correct signal at the output 33 or 34, there occurs via the connection 35 a switching-on or a switching-off of a switch 37 belonging to a switching element 36. With the aid of the switch 37 a current load or consumer 38 can be selectively connected with or disconnected from the power supply network or mains 6.

The electronic portion of the remote control receiver 1, in other words the receiver section 20 and the evaluation section 26, have only low power requirements, for instance 0.2 watts. For economical reasons the current supply section or arrangement 7 is therefore dimensioned only for supplying a relatively small amount of power. Only for actuating the switching element 36 with the switch 37 is there momentarily required a greater amount of power. The current supply arrangement 7 which has been designed at close tolerance for reasons of economy would not be able to deliver the then needed energy within a sufficiently short period of time. It is for this reason that there is operatively associated with the switching element 36 preferably a switching energy storage in the form of a storage capacitor of sufficient capacitance. Such an arrangement has been disclosed, for instance, in the aforementioned U.S. Pat. No. 3,916,211, to which reference may be readily had and the disclosure of which is incorporated herein by reference.

Figure 2:
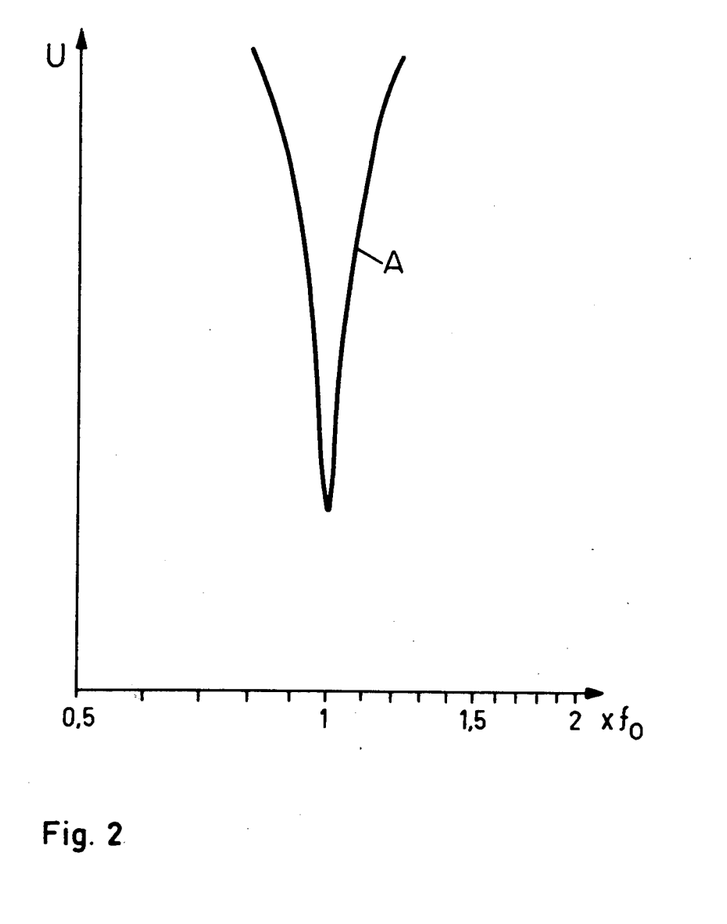
FIG. 2 is a diagram illustrating a response characteristic of a selective receiver section of a remote control receiver.

As will be understood from the showing of FIG. 1, as the receiver section 20 there can be utilized, for instance, an active filter of the type described in the aforementioned Swiss Pat. No. 554,617, the disclosure of which is likewise incorporated herein by reference. Yet, there also can be used a different filter possessing adequate selectivity. One such type filter, measured alone, and related to constant output voltage, has a response characteristic A. The response characteristic A, shown by way of example in FIG. 2, illustrates the input voltage U required for a predetermined output voltage as a function of the input frequency related to the reference frequency $f_o$. The reference frequency $f_o$ corresponds to the remote control frequency $f_S$ to be received.

Figure 3:
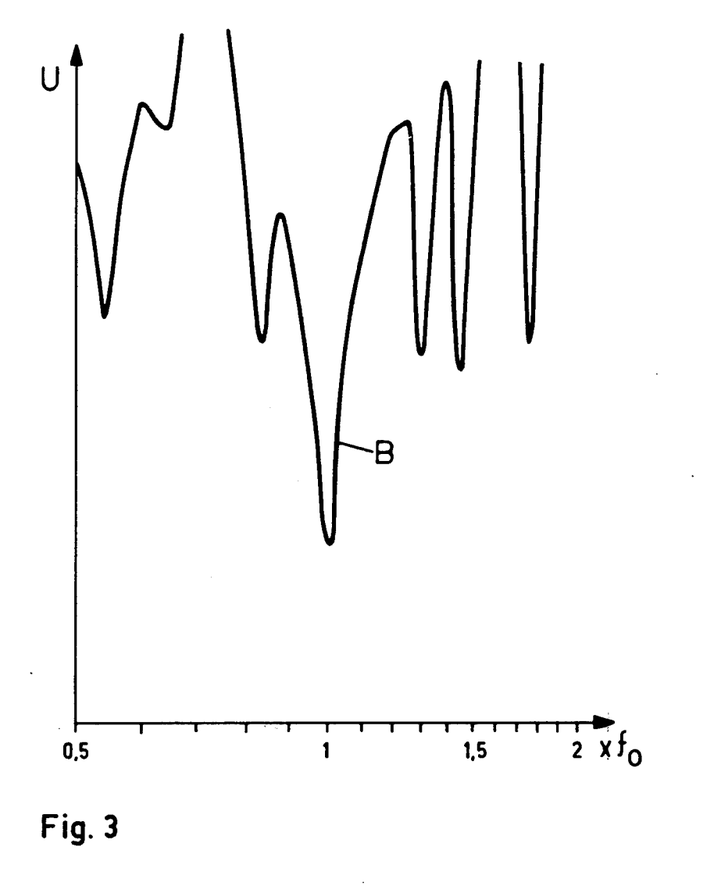
FIG. 3 is a diagram illustrating a response characteristic of the remote control receiver according to FIG. 1.

A similar response characteristic then also would be expected for a remote control receiver according to the circuit configuration of FIG. 1. However, this is not the case. Quite to the contrary, with a remote control receiver designed according to FIG. 1, there is obtained a response characteristic B, for instance of the type generally illustrated in FIG. 3. Consequently, it will be apparent that the remote control receiver 1 responds best to its assigned remote control frequency $f_S = f_o$, but apart from such also to numerous other frequencies, even if with lesser sensitivity. In consideration of the different peaks of different signals which appear in practice at power supply networks, such an ambiguous response characteristic as in FIG. 3 is unacceptable for certain applications or for the positive transmission of remote control signals. The aforementioned ambiguity of the response characteristic B therefore constitutes a drawback of prior art remote control receivers, and it is therefore an object of the present invention to disclose techniques for overcoming this drawback.

Figure 4:
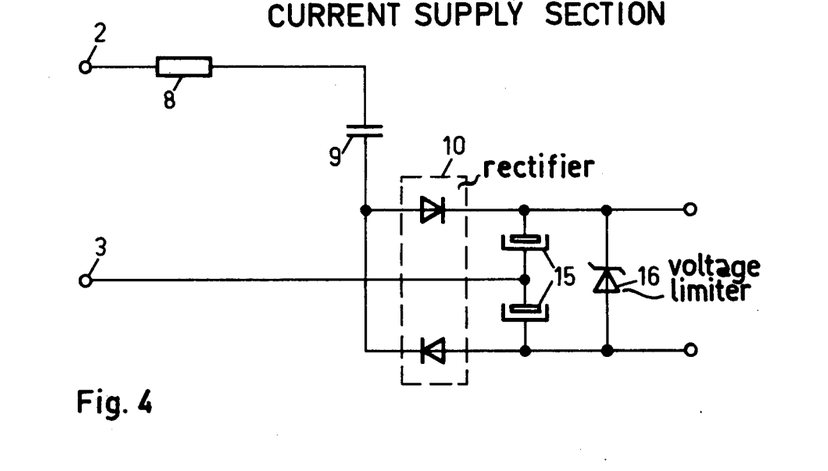
FIG. 4 is a variant of the current supply arrangement or section shown in FIG. 1.
Figure 5:
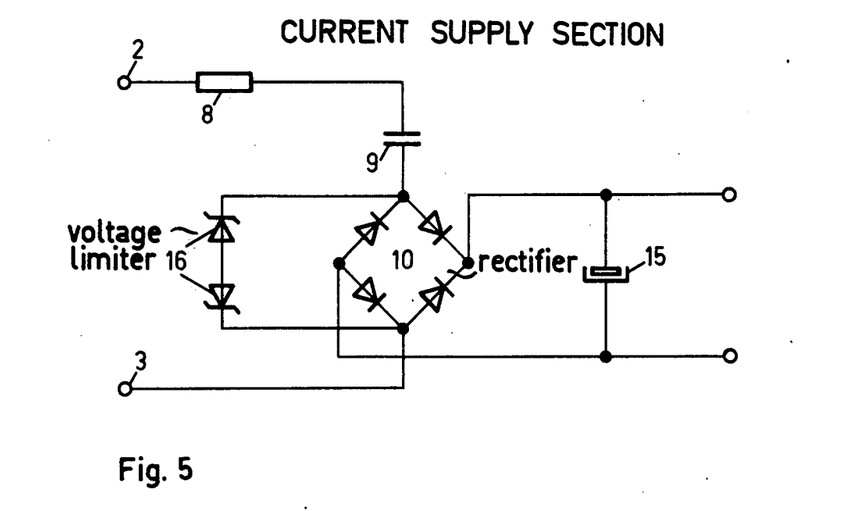
FIG. 5 is a further variant of the current supply section shown in FIG. 1.

The cause of the ambiguity of the response characteristic (see FIG. 3) is the non-linear impedance characteristic of the current supply arrangement or section 7, especially its rectifier 10, which is coupled with the input current circuit of the selective receiver section 20. Also other circuit arrangements for a current supply section with capacitive dropping resistance, for instance, as shown in FIGS. 4 and 5, equally cause such ambiguity of the response characteristic of the remote control receiver.

Due to the distortion and mixing of the alternating-current voltages appearing in toto at the terminals 2 and 3 of the remote control receiver, that is to say, the network or line voltage, the network voltage-harmonics and the arriving desired signals and disturbance signals, it is possible for numerous frequencies to be transposed upon the actual pass frequency $f_o$ of the selective receiver section 20 and, as a result, there is present the aforementioned ambiguity in the response characteristic of the remote control receiver.

The problem with which the invention is concerned thus is directed to the provision of means for overcoming or at least reducing to a sufficient degree ambiguities of the response characteristic of the remote control receiver. In this connection it is of course important that with the use of such means there are not again annihilated the economical advantages which were realized due to the previously discussed priceworthy current supply arrangement. Such means therefore, in order to be of practical significance, must only require an extremely small expenditure in equipment.

Figure 6:
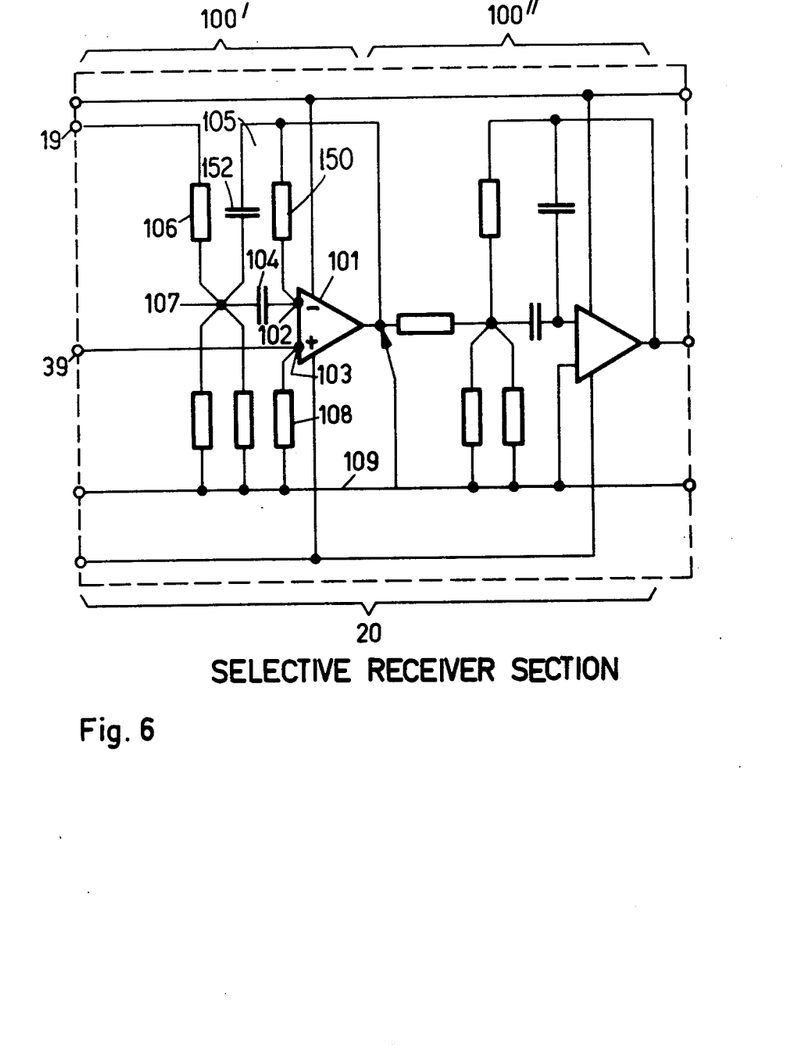
FIG. 6 is a circuit diagram of a selective receiver section.

FIG. 6 illustrates a simplified circuit diagram of an exemplary embodiment of a selective receiver section or portion 20 which is equipped with two series connected active filters 100' and 100". Since such selective receiver sections are known as such, as taught for instance in the previously mentioned Swiss Pat. Nos. 554,617 and 554,618 the disclosures of which are incorporated herein by reference, further details of the circuitry, beyond the comments to follow, are not believed to be necessary. It will be recognized that the first active filter 100' contains an amplifier 101, for instance a differential or operational amplifier having a first inverting input 102 and a second non-inverting input 103. Further, there will be recognized that the inverting input 102 is connected by means of a capacitor 104 of the frequency-determining network 105 via a resistor 106 with an input 19 of the selective receiver section 20, and the non-inverting input 103 of the amplifier 101 is connected by means of a resistor 108 with a busbar 109. The frequency-determining network 105 additionally contains the resistor 150 and the capacitor 152, all as described more fully in Swiss Pat. No. 554,617 and 554,618.

The signals delivered to the input 19 of the selective receiver section 20 arrive at the inverting input 102 of the differential amplifier 101. The non-inverting input 103 of the differential amplifier 101 does not carry any alternating-current signal.

Figure 7:
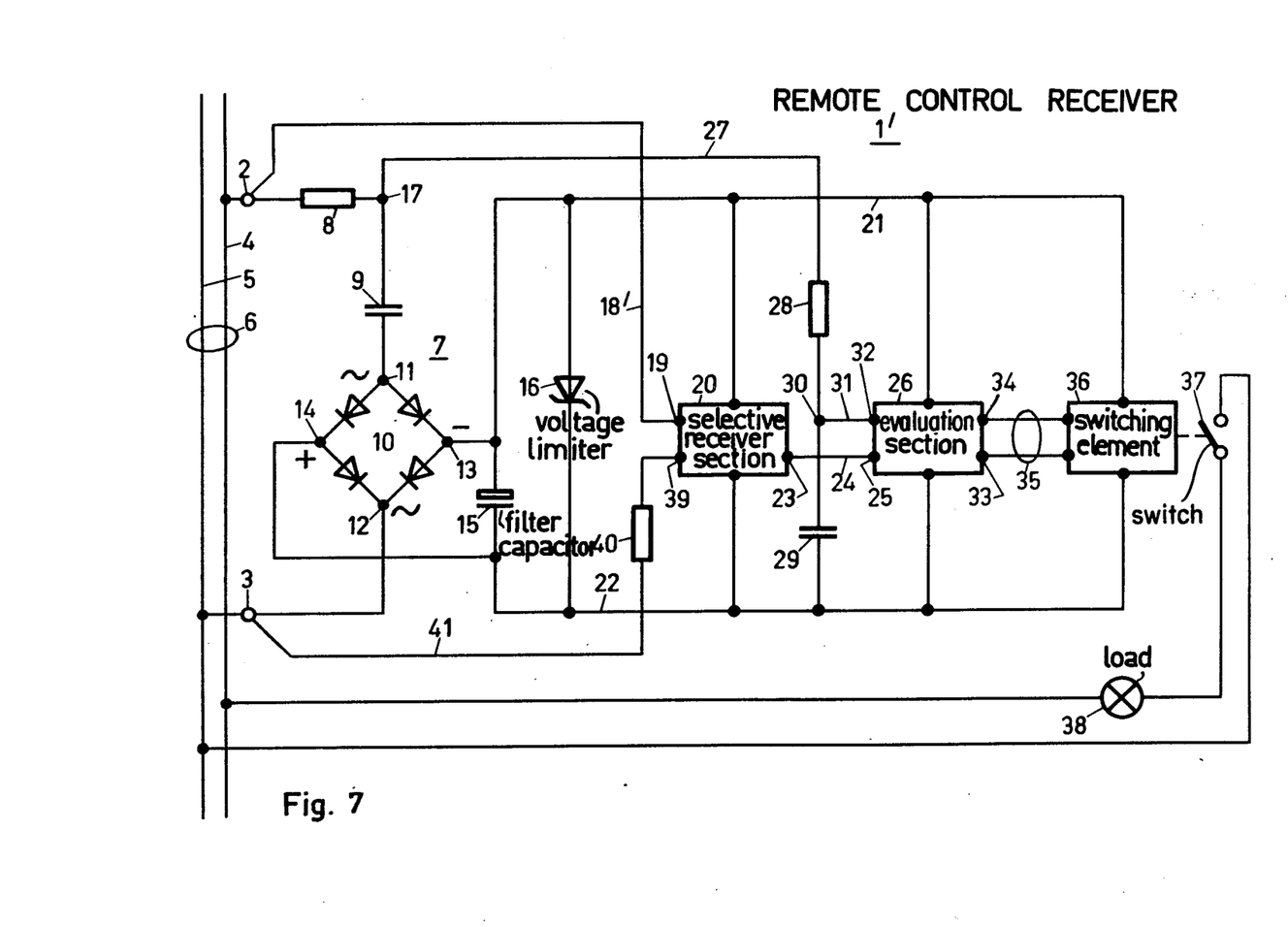
FIG. 7 illustrates a first exemplary embodiment of the present invention.

FIG. 7 illustrates as a first exemplary embodiment of the invention a circuit diagram of a remote control receiver 1'. The circuit diagram of FIG. 7 will be seen to contain a number of decisive changes in relation to the circuit diagram illustrated in FIG. 1. As already mentioned, alternating-currents of different frequencies flow in the current circuit from the connection terminal 2 by means of the protective impedance 8, the capacitor 9, the rectifier 10 to the input terminal 3. In particular, there flow together with the network frequency and its harmonics as well as with the signal frequency and its harmonics, and — owing to the non-linear characteristic to the rectifier 10 — and also the summation and difference-frequencies of the previously mentioned frequencies. All of these alternating-currents generate by means of the protective impedance 8 a first disturbance voltage which contributively causes the aforementioned ambiguity and consists of numerous different frequency components.

This first disturbance voltage appearing across the protective impedance 8, with the circuit of FIG. 1, arrives by means of the conductor 18 at the first input 19 of the selective receiver section 20, because the conductor 18 leads to the circuit point or junction 17 following the protective impedance 8. Constituting a first means for reducing the aforementioned ambiguity, there is provided according to the showing of FIG. 7, the conductor 18' from the input 19 of the selective receiver section 20 which is connected in front of the protective impedance 8, i.e. at the input terminal 2 of the remote control receiver 1'.

However, it is to be observed that due to the generally required surge voltage resistance of the remote control receiver 1', there must be provided a surge voltage resistant construction of the input resistor 106 (cf. FIG. 6). However, this does not constitute any practical drawback, since surge voltage resistant-resistors suitable for the purposes of the invention can be nowadays obtained very inexpensively.

A second disturbance voltage, which comes into existence due to the aforementioned current distortions and mixing, appears between the direct-current terminals 13 and 14 of the rectifier 10 — which with respect to alternating-currents are practically short-circuited via the filter capacitor 15 — and the alternating-current terminal 12 of the rectifier 10. Now since for reasons of circuit design the positive busbar 22, which functions as the system ground for the selective receiver section 20, cannot be directly connected with the input terminal 3, which is at the potential of the null conductor 5 of the power supply line 6, this second disturbance voltage also reaches the signal input circuit of the selective receiver section 20.

Hence, according to FIG. 7, as a second means for reducing the aformentioned ambiguity of the response characteristic of the remote control receiver 1', the second input 39 of the selective receiver section 20 is connected by means of a resistor 40 and a conductor 41 with the input terminal 3, and thus, also with the alternating-current terminal 12 of the rectifier 10. The aforementioned second disturbance voltage is thus delivered from the input terminal 3 via the voltage divider composed of the resistors 40 and 108 (see FIGS. 6 and 7) to the non-inverting input 103 of the amplifier 101 in the selective receiver section 20, which amplifier 101 is constructed as a differential amplifier. With appropriate selection of the voltage divider ratio of such voltage divider 40, 108 it is possible to extensively compensate the previously discussed disturbance voltage in the signal input circuit of the selective receiver section 20.

Figure 8:
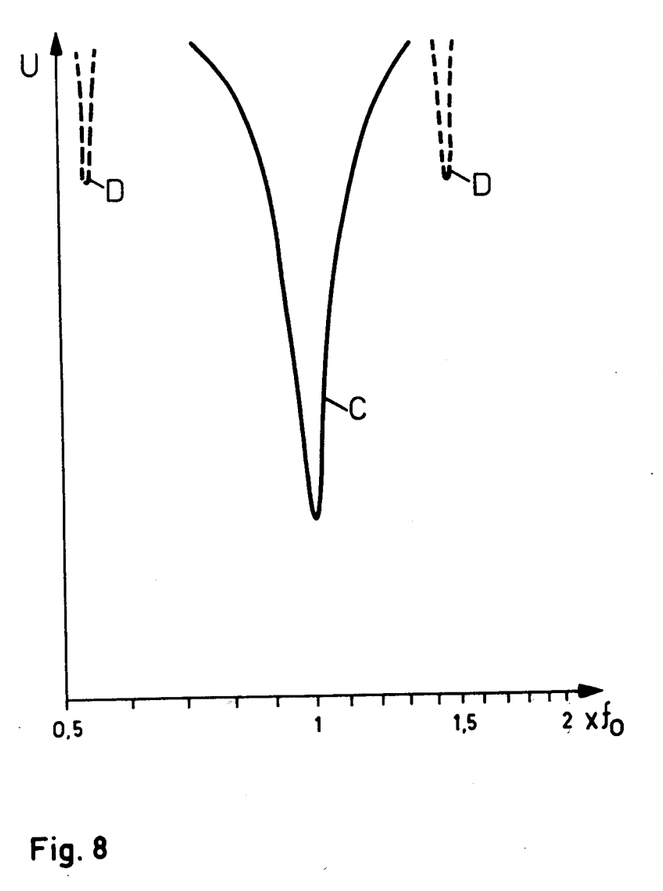
FIG. 8 is a diagram illustrating a response characteristic of a remote control receiver according to FIG. 7.

In this connection it is to be observed that this compensation is not very critical, as will be recognized from the showing of FIG. 8. In FIG. 8 there is illustrated the response characteristic C of the remote control receiver 1' constructed according to FIG. 7, with optimum compensation. With the voltage condition intentionally deviating by 20% from the optimum value, that is, only coarse compensation, there appears according to the response characteristic D (shown in broken lines), in addition to the response characteristic C, an ambiguity which however is markedly reduced in relation to that of FIG. 3.

Figure 9:
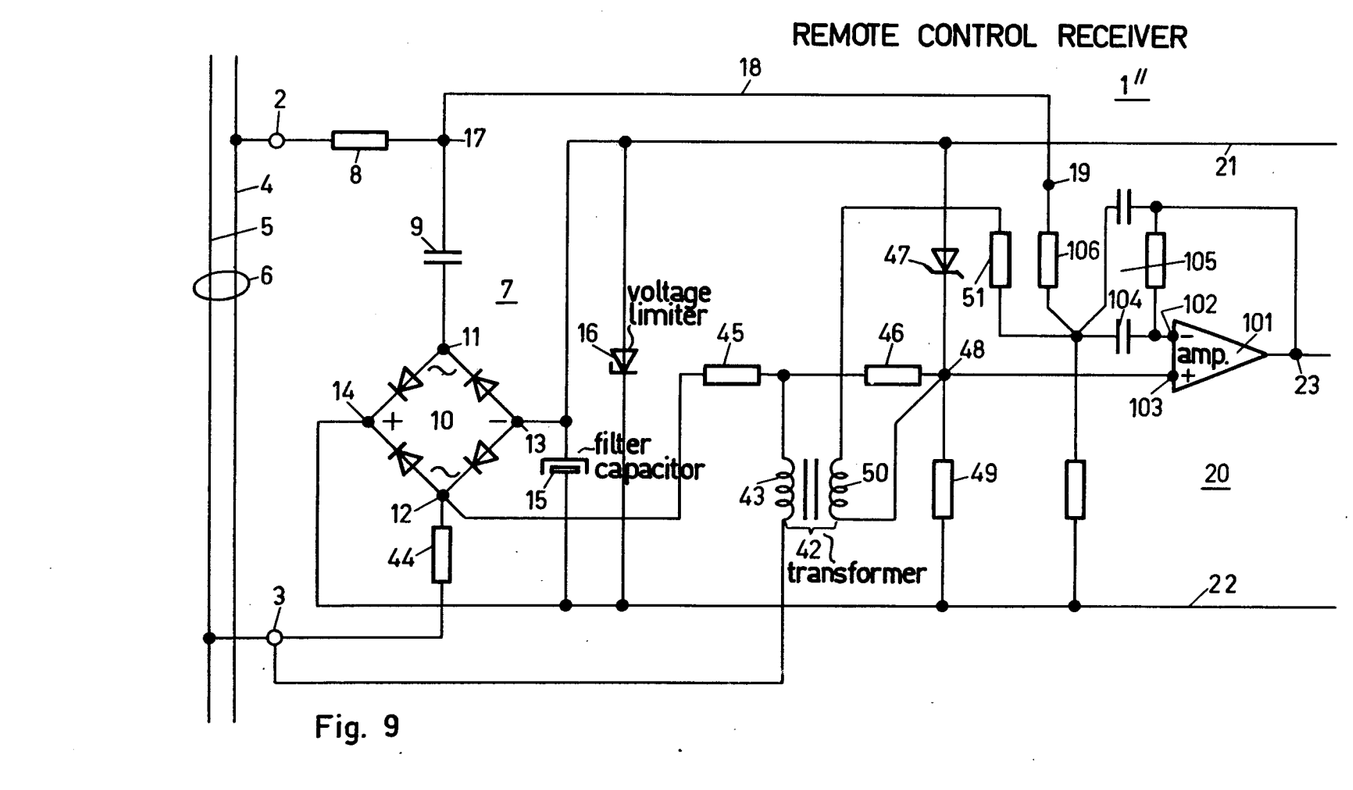
FIG. 9 illustrates a further examplary embodiment of the invention.

A further exemplary embodiment has been illustrated in FIG. 9. In order to improve clarity in illustration the circuit components following the selective receiver section or portion 20 have been conveniently omitted. Yet in this respect reference may be made to the circuit showing of FIG. 7 where the same have been illustrated. The remote control receiver 1" illustrated in FIG. 9 is manifested by the features that the disturbance voltages appearing across the protective impedance 8 and between the direct-current terminals 13, 14 and the alternating-current terminal 12 can be compensated by using a small transformer 42. The use of a differential amplifier at the input side of the selective receiver section 20 is not necessary because, the phase shift needed for compensation is produced by means of the transformer 42.

It will be seen that the primary winding 43 of the transformer 42 is connected with a series circuit of an impedance 44 and a resistor 45. The impedance 44 is disposed between the alternating-current terminal 12 of the rectifier 10 and the connection point or terminal 3 of the remote control receiver 1". With optimum dimensioning of the impedance 44 there appears thereat a voltage drop which is the image of the disturbance voltage appearing at the protective impedance 8. The resistor 45 has connected in series therewith a resistor 46 as well as a Zener diode 47 connected with the negative busbar 21. The connection point or terminal 48 between the resistor 46 and the diode 47 is connected through the agency of a resistor 49 with the positive busbar 22. The connection point or terminal 48 therefore carries a defined direct-current voltage. Across the voltage divider formed by the resistors 45 and 46 there appears an alternating-current voltage which is the image of the disturbance voltage appearing between the positive busbar 22 functioning as the system ground and the input terminal 3 functioning as the network ground. The sum of both disturbance voltages delivered to the primary winding 43 of the transformer 42, after having been transformed, appear at the secondary winding 50 of the transformer 42. One terminal of the secondary winding 50 is located at the connection point 48 which is coupled with the input 103 of the amplifier 101 and carries a constant potential. The other terminal of the secondary winding 50 is connected through the agency of a resistor 51 and the capacitor 104 with the other input 102 of the amplifier 101. Also according to this second embodiment there can be obtained a compensation or reduction of the previously mentioned ambiguity of the response characteristic, and there is dispensed with the need for a differential amplifier.

Figure 10:
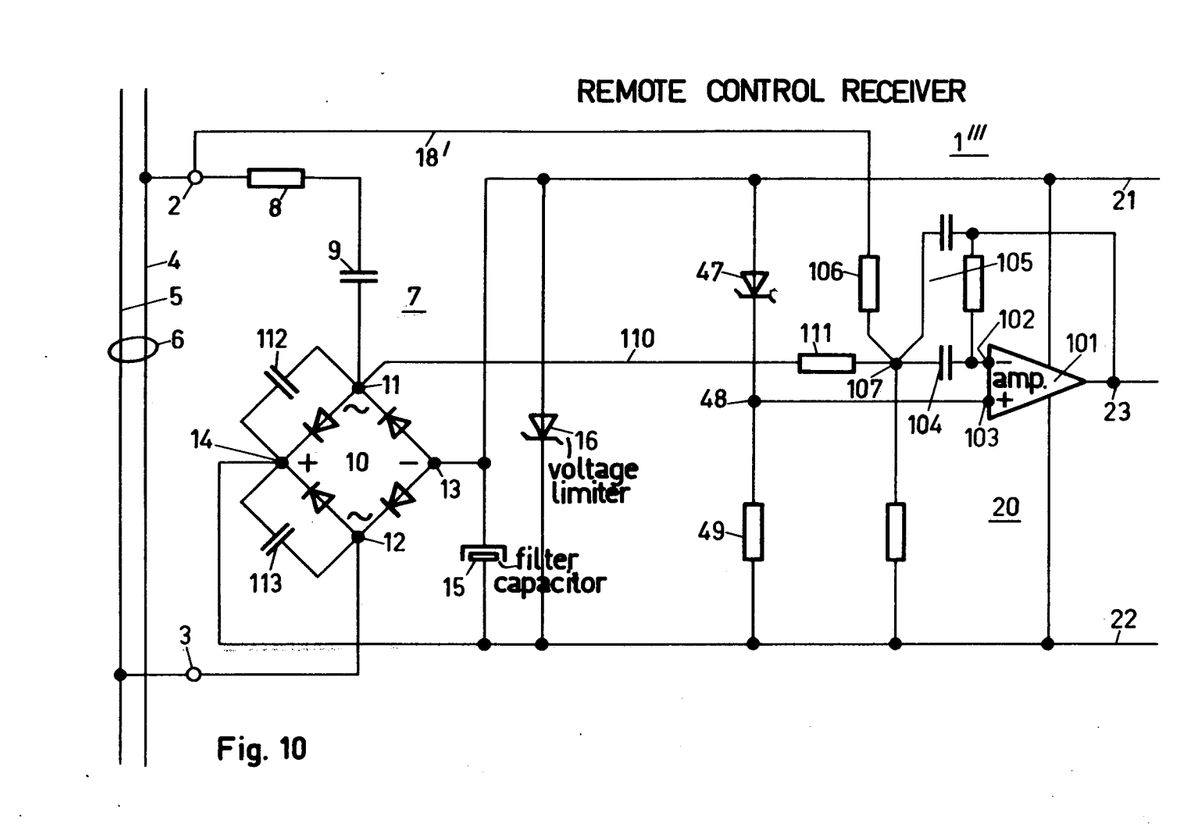
FIG. 10 illustrates a still further examplary embodiment of the invention.

FIG. 10 illustrates a circuit diagram of a further exemplary embodiment. A remote control receiver 1''' is connected with its input terminals 2 and 3 at the conductors 4 and 5 of the power supply network 6. The network section 7 possesses a protective impedance 8, a capacitor 9 and a full-wave rectifier 10 which is connected by means of its alternating-current terminals 11 and 12 in series with the capacitor 9. The alternating-current terminal 12 is connected with the input terminal 3. The direct-current terminals 13 and 14 of the rectifier 10 are connected parallel to the filter capacitor 15 and the Zener diode 16.

Just as was the case for the exemplary embodiment of FIG. 9 one input 103 of the amplifier 101 of the selective receiver section 20 is coupled with a circuit point or junction 48 which, in turn, is connected by means of the Zener diode 47 with the negative busbar 21 and, on the other hand, is connected via the resistor 49 with the positive busbar 22 and, thus, carries a constant potential.

From the input terminal 2 the conductor or line 18' leads by means of the resistor 106 to a circuit junction or joint 107 of the frequency determining network 105 of the selective receiver section 20. By means of the capacitor 104 the circuit junction or point 107 is connected with the inverting input 102 of the amplifier 101.

The one alternating-current terminal 11 of the rectifier 10 is connected by means of a conductor or line 110 and a resistor 111 with the circuit point or junction 107 and by means of the capacitor 104 with the inverting input 102 of the amplifier 101 of the selective receiver section 20.

By means of two capacitors 112 and 113 respectively, which are connected between the alternating-current terminal 11 and the direct-current terminal 14 and the direct-current terminal 14 and the alternating-current terminal 12, respectively, there is achieved the result that the voltage between the positive busbar 22 and the alternating-current terminal 11 and the voltage between the positive busbar 22 and the other alternating-current terminal 12 are as much in phase opposition as possible. This is the prerequisite for an extensive compensation of the disturbance voltage components emanating from the network section 7 of the remote control receiver 1''' and coming together at the circuit junction or point 107 by means of the conductors 18' and 110. Also this solution provides for an extensive compensation of the previously discussed ambiguity of the response characteristic of the remote control receiver, and this solution, like the solution of FIG. 9, is not dependent upon the use of a differential amplifier at the input side of the selective receiver section or portion 20. Furthermore, with the solution of FIG. 10 there is rendered superfluous the use of a transformer, as such was necessary for the solution of FIG. 9.

It is here still to be mentioned that the principle of compensating the aforementioned disturbance voltages, and disclosed of the basis of the heretofore described exemplary embodiments, can be used in analogous manner also in the case of remote control receivers which do not have any amplifier at the input of the selective receiver section. It is namely sufficient if the input of the selective receiver section has delivered thereto, apart from the desired signal and the aforementioned disturbance signals, phase opposite compensation voltages. It is totally immaterial whether this phase opposition condition is accomplished with the aid of opposite phase inputs of the selective receiver section (FIG. 7), or with the aid of a phase-shifting element, such as for instance a transformer (FIG. 9), or by tapping-off at circuit points (FIG. 10) at which there are present opposite phase disturbance voltages.

While there are shown and described present preferred embodiments of the invention, it is to be distinctly understood that the invention is not limited thereto, but may be otherwise variously embodied and practiced within the scope of the following claims.

Accordingly, what is claimed is:

1. A circuit arrangement for a remote control receiver receiving remote control signals by means of a power supply network, comprising a remote control receiver comprising a selective receiver section having an input side, a circuit containing at least one non-liner circuit element connected with the input side of the selective receiver section, and means for compensating at the input side of the selective receiver section the ambiguity of the response characteristic of the remote control receiver to preclude response of the selective receiver section to disturbance signals produced by said at least one non-linear circuit element and to render said selective receiver section only responsive to a given assigned frequency to which the remote control receiver should respond.

2. The circuit arrangement as defined in claim 1, wherein:
said compensating means incorporating structure for removing from said circuit containing said at least one non-linear circuit element a signal having opposite phase with respect to the phase of the disturbance signals.

3. The circuit arrangement as defined in claim 1 wherein said selective receiver section comprises a differential amplifier, said remote control receiver including a first input terminal and a second input terminal, the selective receiver section having at its input side a first input and a second input, said compensating means comprising circuitry wherein the first input of the selective receiver section being connected with the first input terminal of the remote control receiver and the second input of the selective receiver section being connected with the second input terminal of the remote control receiver, in order to at least approximately compensate disturbance voltages caused by the non-linear circuit element.

4. The circuit arrangement as defined in claim 1, wherein said selective receiver section comprises a differential amplifier, said differential amplifier having a first input and a second input, at least one protective impedance in circuit with the non-linear circuit element, the remote control receiver having a first input terminal and a second input terminal, a surge voltage resistant resistor connecting the first input of the differential amplifier with the first input terminal of the remote control receiver and the second input of the differential amplifier being connected with the second input terminal of the remote control receiver, said compensating means blocking from the selective receiver section a first disturbance voltage caused by the non-linear circuit element and appearing at said at least one protective impedance and for at least approximately compensating a second disturbance voltage produced by said non-linear circuit element.

5. The circuit arrangement as defined in claim 1, wherein said selective receiver section comprises an amplifier, said amplifier having a first input and a second input, a protective impedance in circuit with the non-linear circuit element, said remote control receiver having a first input terminal and a second input terminal, the first input of the amplifier receiving via said first input terminal a receiver signal and a first disturbance voltage which appears at the protective impedance due to the non-linear circuit element, said compensating means comprising a transformer having a primary side and a secondary side, said transformer delivering to the first input of the amplifier a first voltage at least approximately compensating said first disturbance voltage, a current circuit containing an impedance and the non-linear circuit element, the primary side of said transformer being connected with said current circuit, and circuit components connecting the secondary side of the transformer with the inputs of the amplifier.

6. The circuit arrangement as defined in claim 5, wherein said impedance is connected with the primary side of the transformer, the non-linear circuit element having a terminal, and wherein between said terminal of the non-linear circuit element and a circuit point of the circuit arrangement carrying a constant potential with respect to said amplifier there is connected a voltage divider composed of two resistors containing therebetween a voltage divider point, the primary side of the transformer being connected at said voltage divider point between said two resistors and at said second input terminal of the remote control receiver, in order to at least approximately compensate the first disturbance voltage which appears across the protective impedance and delivered to said first input of the amplifier and a second disturbance voltage which appears at the non-linear circuit element.

7. The circuit arrangement as defined in claim 1, wherein said selective receiver section has at its input side an input, said compensating means comprising a dropping resistance in circuit with said input of said selector receiver section, means for delivering to said input of said selective receiver section by means of said dropping resistance both a desired receiver signal and a disturbance voltage appearing at the non-linear circuit element which is at least approximately in phase opposition to another disturbance voltage, said selective receiver section having a further input, and means for supplying a constant voltage to said further input of said selective receiver section.

8. The circuit arrangement as defined in claim 7, wherein said non-linear circuit element comprises a Graetz rectifier having first and second direct-current terminals and first and second alternating-current terminals, said compensating means further comprising a first capacitor connected between one of said alternating-current terminals and one of said direct-current terminals and a second capacitor connected between the one direct-current terminal and the other of said alternating-current terminals of the rectifier, in order to improve said phase opposition.

* * * * *